US007158183B1

(12) United States Patent
Ohta

(10) Patent No.: US 7,158,183 B1
(45) Date of Patent: Jan. 2, 2007

(54) DIGITAL CAMERA

(75) Inventor: Tadashi Ohta, Yokohama (JP)

(73) Assignees: Nikon Corporation, Tokyo (JP); Nikon Technologies Inc., Tokyo (JP)

( * ) Notice: Subject to any disclaimer, the term of this patent is extended or adjusted under 35 U.S.C. 154(b) by 865 days.

(21) Appl. No.: 09/650,764

(22) Filed: Aug. 29, 2000

(30) Foreign Application Priority Data

Sep. 3, 1999 (JP) .................................. 11-249915
Feb. 18, 2000 (JP) ............................. 2000-046705

(51) Int. Cl.
 *H04N 5/238* (2006.01)
 *H04N 9/73* (2006.01)
(52) U.S. Cl. ................................. 348/364; 348/224.1
(58) Field of Classification Search ................ 348/364,
 348/362, 345, 312, 294, 296, 255, 218.1,
 348/221.1, 224.1, 228.1, 230.1, 223.1, 222.1
 See application file for complete search history.

(56) References Cited

U.S. PATENT DOCUMENTS

| | | | | |
|---|---|---|---|---|
| 5,051,833 A | * | 9/1991 | Tsuji | 348/364 |
| 5,363,137 A | * | 11/1994 | Suga et al. | 348/302 |
| 5,694,495 A | | 12/1997 | Hara et al. | |
| 5,751,354 A | * | 5/1998 | Suzuki et al. | 348/349 |
| 5,815,608 A | | 9/1998 | Lange et al. | |
| 5,880,781 A | * | 3/1999 | Udagawa et al. | 348/279 |
| 6,342,921 B1 | * | 1/2002 | Yamaguchi et al. | 348/322 |
| 6,353,488 B1 | * | 3/2002 | Hieda et al. | 348/207.99 |
| 6,487,309 B1 | * | 11/2002 | Chen | 382/162 |
| 6,542,194 B1 | * | 4/2003 | Juen | 348/221.1 |
| 6,559,889 B1 | * | 5/2003 | Tanaka et al. | 348/362 |
| 6,661,451 B1 | * | 12/2003 | Kijima et al. | 348/220.1 |
| 6,757,016 B1 | * | 6/2004 | Ueno et al. | 348/222.1 |
| 6,888,568 B1 | * | 5/2005 | Neter | 348/222.1 |
| 2002/0118291 A1 | * | 8/2002 | Ishigami et al. | 348/311 |
| 2003/0128290 A1 | * | 7/2003 | Toyofuku et al. | 348/364 |
| 2004/0061801 A1 | * | 4/2004 | Hata | 348/350 |

(Continued)

FOREIGN PATENT DOCUMENTS

JP 2-32685 2/1990

(Continued)

*Primary Examiner*—Aung Moe
(74) *Attorney, Agent, or Firm*—Oliff & Berridge, PLC

(57) ABSTRACT

A digital camera having small time lag for recording the object after releasing a shutter by employing less movable parts, and by employing an image sensor for other purpose as well as actual forming picture image for recording the object is provided. According to one aspect of the present invention, a digital camera includes an image sensor having a plurality of two-dimensionally arranged pixels capable of selectively reading out signals from desired pixels and capable of adding signals of at least two pixels prior to getting the output from the image sensor, a first processor for processing outputs got from the individuals of the pixels of the image sensor to form a picture image of an object of the camera and a second processor for processing the added signal of the image sensor for light metering of the object. In the digital camera according to the present invention, by using an image sensor capable of selectively reading out signals from desired pixels and capable of adding signals prior to getting the output from the image sensor, signals from respective pixels are read out while processing picture image forming, and the output is got from the image sensor after signals from respective pixels within light-metering area are added while processing light metering. Accordingly, calculation for light metering can be processed quickly and a circuit for processing signals output from the image sensor can be simple. As a result, power savings as well as cost savings can be realized.

3 Claims, 18 Drawing Sheets

U.S. PATENT DOCUMENTS

2004/0169767 A1 * 9/2004 Norita et al. ............... 348/364

FOREIGN PATENT DOCUMENTS

| JP | A-2-32685   | 2/1990 |
| JP | 2-210315    | 8/1990 |
| JP | 2-210974    | 8/1990 |
| JP | A-2-210315  | 8/1990 |
| JP | A-2-210974  | 8/1990 |
| JP | 5-7333      | 1/1993 |
| JP | A-5-7333    | 1/1993 |
| JP | 9-184973    | 7/1997 |
| JP | 09184973 A *| 7/1997 |
| JP | A-9-184973  | 7/1997 |
| JP | 11344662 A *| 12/1999 |
| JP | A-11-344662 | 12/1999 |

* cited by examiner

BGBGBGBG
GRGRGRGR
BGBGBGBG
GRGRGRGR
BGBGBGBG
GRGRGRGR

Fig. 2a

GRGRGRGR
GBGBGBGB
GRGRGRGR
GBGBGBGB
GRGRGRGR
GBGBGBGB

Fig. 2b

|1|2|3|4|1|
|---|---|---|---|---|
|2|3|4|1|2|
|3|4|1|2|3|
|4|1|2|3|4|
|1|2|3|4|1|

Fig. 13

|1|2|3|4|1|2|3|4|
|---|---|---|---|---|---|---|---|
|4|1|2|3|4|1|2|3|
| | | | | | | | |
| | | | | | | | |
|3|4|1|2|3|4|1|2|
|2|3|4|1|2|3|4|1|

Fig. 14

DIGITAL CAMERA

BACKGROUND OF THE INVENTION

1. Field of the Invention

The present invention relates to a digital camera employing a solid-state image sensor, forming picture image of an object, and recording onto a recording medium, in particular, to a digital camera detecting focusing condition, light metering, and performing white balance process of an object using a single solid-state image sensor, and forming picture image of the object automatically controlling itself based on measured data.

2. Description of Related Art

In order to form picture image of an object, it is necessary to know a distance to the object, light metering of the object, and white balance of the object. Accordingly, other than image sensor for forming picture image, it has been necessary to have exclusive devices for detecting such as AF (autofocus: detecting focus of the object and automatically driving the picture image forming lens based on the detected data), AE (automatic exposure: light metering of the object and controlling exposure condition (shutter speed and f-number) based on the measured data), and WB (white balance: measuring the color temperature of the object and processing appropriate color reproduction of the object based on the measured data, or AWB (automatic white balance: when this process is controlled automatically)), and, moreover, it has been necessary for each process to have exclusive optical systems according to circumstances.

For example, in AF, it has been necessary to have an exclusive optical system for arranging an AF sensor in a position equivalent to the film plane, and, furthermore, in order to calculate AF with optimum quantity of light, it has been necessary to have another sensor for monitoring incident quantity of light other than image sensor for forming picture image.

In AE, as same as AF, in order to enhance accuracy of light metering, it has been necessary to have exclusive optical system and exclusive sensor having a plurality of sensing area.

After releasing the shutter, a digital camera, other than ordinary video camera, is necessary to acquire information of the object with optimum quantity of light as fast as possible, in order to avoid losing a shutter chance. Therefore, it has been necessary to have an exclusive WB sensor for measuring color temperature of the object before forming picture image in order to record a picture with optimum WB condition.

By the way, it has variously been proposed that all or a portion of AF, AE, and AWB are performed by an image sensor. The Japanese Laid-Open Patent Application No. 2-210974 discloses an idea that an image sensor performs all of these processes.

It discloses that a CCD image sensor performs in order from AWB, AF, AE, and, then, forming picture image of an object. An outline of the contents is described below. At first, in order to perform various calculations accurately within dynamic range of the CCD, an overflow time of the CCD at brightness of the object while forming picture image is measured. In the measurement of color temperature later on, a diffusing plate is inserted in the optical system, quantity of light in the image plane is equalized, and, then, exposed. Then, output signal from the image sensor is passed through a color-separation circuit and an integrator, A/D converted, and performed AWB calculation in a CPU.

In the AF calculation after that, a defocusing lens and a phase difference detection optics are inserted into the optical system, and the CCD is exposed with aforementioned overflow time after being reset. Among the output of CCD, the only output from the AF area is selected by a switch located outside, A/D converted, and performed AF calculation in the CPU. The principle and a way to realize the AF method using phase difference is disclosed, for example, in the Japanese Laid-Open Patent Application No. 9-184973 showing a method using time sequential pupil division.

FIG. 6 shows the principle disclosed in the application. In FIG. 6, reference number 501 denotes a picture image forming lens, 502 denotes a position of an aperture stop of the picture image forming lens 501, 503 denotes a focusing plane, 502a and 502b denote two apertures located the position of the aperture stop, 505a and 505b denote light rays passing through the apertures 502a and 502b respectively, and are coincide with each other in the focusing plane 503. However, the rays are not coincide in the position 503a, and differs in connection with the separation of the apertures and the difference to the focusing plane 503.

Suppose the position of the image plane be 503a, the distance between the apertures be X, the separation of the images focused in the image plane be Y, the distance between the position of the aperture stop and the image plane be L, and the defocusing amount be Z, the following equation is satisfied;

$$X/Y=(L-Z)/Z.$$

The optical system can be focused by controlling the defocusing amount Z.

FIG. 7 is another example according to this principle disclosed in the Japanese Laid-Open Patent Application No. 9-184973. In FIG. 7, reference number 602 denotes aperture stops blocking light flux to the optical system, 604 denotes a blade arranged on the shield 602 blocking either one of double apertures, 602a or 602b. By blocking the apertures 602a and 602b by using the blade 604 in turn, time sequential signals of detected focus are output from the image sensor. The defocusing amount is calculated based on the signals, so that the optical system is controlled.

Then, in AE calculation after that, the optics used for aforementioned AF measurement is removed, and the CCD is exposed. Among the output of the CCD, either of output area according to a spot measurement or an average measurement is selected by a switch located outside, the output is integrated, A/D converted, and processed AE calculation in the CPU.

By the way, it has been proposed that the image sensor is fabricated by using CMOS process capable of realizing low cost and low power consumption. Various types of CMOS image sensor having such functions of signal processing or calculation inside the device itself have been proposed. Products applied to low priced digital camera have recently been announced.

CMOS image sensor is characterized by reading out after amplifying minute signal photoelectrically converted by photodiode by means of cell amplifier formed in each pixel. Various types of CMOS image sensor have been proposed such as SIT (Static Induction Transistor), CMD (Charge Modulation Device), BASIS (BAse Stored Image Sensor), FGA (Float Gate Array), BCMD (Bulk Charge Modulation Device), AMI (Amplified MOS intelligent Imager), and BCAST (Buried Charge Accumulator and Sensing Transistor array).

In addition to this, a vision chip integrating image sensor with calculator having a function of parallel processing for 3D image and an artificial retina chip capable of performing simple retina function have recently been announced. Regarding the artificial retina chip, application to a field such as game, cellular phone, or security system has been announced.

Principle and function of the artificial retina chip are precisely disclosed in U.S. Pat. Nos. 5,694,495 and 5,815,608. Major functions realized by the artificial retina chip are described bellow. At first, it is possible to read out lines between any two lines by sending signals to a plurality of scanners controlling readout of each column of the image sensor (sensor). Multiplication and addition of voltage supplied to the plurality of scanners and intensity of input image are obtained as output of the sensor. As a result, it is easy to obtain image output performed inter-pixel operation (emphasized profile, and the like).

Furthermore, pattern matching is made possible by sequentially supplying scanner-controlling signal as predetermined pattern to the plurality of scanners. Moreover, any range along column direction can be readout by equipping a random scanner for controlling column direction of the sensor. As a result, a picture image of any area can be read out together with the function of aforementioned any-line-readout. On occasion of a plurality of watching patterns, it is possible to read out the plurality of areas by setting a plurality of read out areas, and read out the plurality of areas in turn.

By arranging a circuit for setting a readout time to obtain the partial image after reset the censor cell according to the brightness of the part, the accumulation time can be varied by each cell or by each area. By reading out after transferred more than two lines while reading out, the resolution can be lowered, so that pattern matching can be performed much faster. Since above-mentioned various functions can be realized by single sensor, outside circuits for realizing these functions, which have been needed so far, become unnecessary, so that circuit becomes smaller and power consumption can remarkably be reduced.

Furthermore, since CCD typed image sensor usually outputs signals by transferring electric charge stored in the photoelectric converting portion in response to light exposure, once the signal is read out, no signal charge is left in the detector cell (so-called "destructive device"). On the other hand, most of the CMOS typed sensors amplify electric charge stored in the photoelectric converting portion by means of the aforementioned cell amplifier using MOS typed FET or the like and output signals converting into voltage, so that no signal charge is consumed while reading out. There is a merit to be able to read out repeatedly while detecting light (so-called "non-destructive device").

However, when AE, AF, and AWB are processed by a single image sensor, special optical system for each measurement is needed to be arranged before each measurement. Moreover, in the aforementioned method using time sequential pupil division, since an object must be formed picture image at least twice by changing the position of the blade, it takes time and time difference occurs between the two picture images, so that focus detection for fast moving object becomes incorrect. Furthermore, the two pupils must be shielded in turn at high speed, so that the mechanism and controller become complicated, and, as a result, reliability of the mechanism is difficult to be maintained. Therefore, when a photographer releases a shutter for forming picture image of an object, it may take considerably long time to start recording the object, and, as a result, the right instant for forming picture image may be lost.

SUMMARY OF THE INVENTION

The present invention is made in view of the aforementioned problem and has an object to provide a digital camera having small time lag for recording the object after releasing a shutter by employing less movable parts, and by employing an image sensor for other purpose as well as actual forming picture image for recording the object.

According to one aspect of the present invention, a digital camera includes an image sensor having a plurality of two-dimensionally arranged pixels capable of selectively reading out signals from desired pixels and capable of adding signals of at least two pixels prior to getting the output from the image sensor, a first processor for processing outputs got from the individuals of the pixels of the image sensor to form a picture image of an object of the camera and a second processor for processing the added signal of the image sensor for light metering of the object.

In the digital camera according to the present invention, by using an image sensor capable of selectively reading out signals from desired pixels and capable of adding signals prior to getting the output from the image sensor, signals from respective pixels are read out while processing picture image forming, and the output is got from the image sensor after signals from respective pixels within light-metering area are added while processing light metering. Accordingly, calculation for light metering can be processed quickly and a circuit for processing signals output from the image sensor can be simple. As a result, power savings as well as cost savings can be realized.

According to another aspect of the present invention, a digital camera includes an image sensor having a plurality of two-dimensionally arranged pixels on which electric charge is accumulated to generate signals, respectively, capable of selectively reading out the signals from desired pixels, and a processor for light metering including a timer for determining a time period from a start of the accumulation of charge to a time when a signal from the image sensor reaches a predetermined level, the light metering being on the basis of the time period.

Another aspect of the present invention is the digital camera described above, wherein the processor for light metering further comprises an output reader for repeating to get the outputs from the pixels in accordance with a predetermined timetable, and a comparator for comparing the signal with the predetermined level, and wherein the timer determines a time period from a start of the accumulation of charge to a time when the comparator informs that the added signal reaches the predetermined level.

While processing light metering, since the light metering is based on the time period from a start of the accumulation of charge to a time when a signal from the image sensor, which outputs signals repeatedly, reaches a predetermined level, it makes it possible to process light metering with high precision.

Another aspect of the present invention is the digital camera described above, further comprising a focus detector for processing the signal of the image sensor to detect the focusing condition of the camera.

Another aspect of the present invention is the digital camera described above, wherein the focus detector processes the outputs from the individuals of the pixels of the image sensor to form a digital image to be investigated in the focus detection.

Another aspect of the present invention is the digital camera described above, wherein the image sensor is further capable of adding signals of at least two pixels prior to getting the outputs from the image sensor, and wherein the focus detector processing the added signals when the light metering informs an insufficient brightness of an object in terms of the focus detection.

Moreover, since signals for the focus detection is obtained from respective pixels in a predetermined area of the same image sensor, the processing for focus detection can be processed quickly with high precision. When brightness of an object is not sufficient for focus detection, signals from adjacent pixels can be added before outputting, so that the digital camera can be adapted to wide range of brightness.

Another aspect of the present invention is the digital camera described above, further comprising a white balance calculator for processing the signal obtainable from the image sensor without resetting the image sensor after the focus detection.

Another aspect of the present invention is the digital camera described above, wherein the image sensor is further capable of adding signals of at least two pixels prior to getting the output from the image sensor, and wherein the white balance calculator processes the added signal.

Furthermore, since signals can be added before getting the output and the processing for white balance is started without resetting the image sensor after the focus detection, the white balance calculation can be processed quickly without time delay and peripheral circuit for white balance can be simple, so that power savings as well as cost savings can be realized.

Another aspect of the present invention is the digital camera described above, further comprising picture image processor for processing the signals from the image sensor to form a picture image of an object of the camera and a white balance calculator for processing the signal obtainable from the image sensor without resetting the charge accumulated on the image sensor for the picture image.

Further, since forming a picture image of an object is processed after focus detection, a time lag to releasing shutter can be minimized. Moreover, since the white balance calculation is processed using signals obtained from the image sensor without resetting the charge for the picture image, the white balance calculation is processed quickly with fidelity to the picture image.

Another aspect of the present invention is the digital camera described above, wherein the focus detector includes an optical system for forming an image of an object on the image sensor, a pair of apertures for dividing light flux of the optical system and filters each arranged across the divided light fluxes passing through the pair of apertures, respectively.

Another aspect of the present invention is the digital camera described above, wherein the image sensor is of a color image sensor having red, green and blue pixels and wherein the filters arranged across the divided light fluxes are of green and magenta filters, respectively.

Furthermore, since a pair of apertures for dividing light flux of the optical system and arranged green and magenta filters, respectively are used while processing focus detection, a green image and a magenta image can be separated easily.

According to one aspect of the present invention, a focusing detector includes a color image sensor having red, green and blue pixels, an optical system for forming an image of an object on the color image sensor, a pair of apertures for dividing light flux of the optical system, and green and magenta filters each arranged across the divided light fluxes passing through the pair of apertures, respectively.

Another aspect of the present invention is the focusing detector described above, further comprising an image processor for forming a first image on the basis of the green pixels of the color image sensor and a second image on the basis of the red and blue pixels of the color image sensor, and a calculator for calculating the degree and direction of defocus of the optical system with respect to the object on the basis of the cross correlation between the first and second images.

Further, since the calculation based on the cross correlation between the green image and the magenta image is processed, the degree and direction of defocusing can be easily detected.

According to one aspect of the present invention, a digital camera includes an image sensor having a plurality of two-dimensionally arranged pixels capable of selectively reading out signals from desired pixels and capable of adding signals of at least two-dimensionally arranged three pixels prior to getting the outputs from the image sensor, a processor for processing outputs got from the individuals of the pixels of the image sensor to form a picture image of an object of the camera, and a white balance calculator for processing the added signals of the image sensor.

Another aspect of the present invention is the digital camera described above, wherein the image sensor has a plurality of kinds of color pixels, and wherein the white balance calculator processes the added signals in which the signals of the same kind of pixels are added, respectively.

According to one aspect of the present invention, a digital camera includes an image sensor having a plurality of two-dimensionally arranged pixels capable of selectively reading out signals from desired pixels, a processor for processing outputs got from the pixels of the image sensor to form a picture image of an object of the camera, and a white balance calculator which functions after the process of the processor.

Furthermore, in the present invention, signals for forming picture image are read out individually, and the white balance calculation is processed using the same signals for forming picture image based on the added signals in which the signals of the same kind of pixels are added, respectively, so that the white balance calculation can be processed right after picture image forming with high fidelity.

According to one aspect of the present invention, a digital camera includes an image sensor having a plurality of two-dimensionally arranged pixels capable of selectively reading out signals from desired pixels for the purpose of at least two of the processes for light metering, focus detection, white balance calculation and picture image forming, and an output reader for getting the outputs from the pixels for the purpose of at least two processes with the signals of the pixels kept without being reset between the first and second processes.

Moreover, since at least two of the processes for light metering, focus detection, white balance calculation and picture image forming are processed sequentially without resetting the image sensor, the processes are processed quickly with minimized time lag.

According to one aspect of the present invention, a digital camera includes an image sensor having a plurality of two-dimensionally arranged pixels capable of selectively reading out signals from desired pixels for the purpose of at least two of the processes for light metering, focus detection, white balance calculation and picture image forming, the image sensor having a plurality of amplifiers of variable gain for amplifying the signals of the pixels, respectively, and a gain controller for changing the gain between at least the two processes.

According to one aspect of the present invention, a digital camera includes an image sensor having a plurality of two-dimensionally arranged pixels capable of selectively reading out signals from desired pixels for the purpose of at least two of the processes for light metering, focus detection, white balance calculation and picture image forming, an amplifier of variable gain for amplifying the output of the image sensor, and a gain controller for changing the gain between at least the two processes.

Further, in at least two of the processes for light metering, focus detection, white balance calculation and picture image forming, the image sensor can amplify the respective signals when reading out signals from the pixels or getting the outputs from the image sensor, so that the optimum processing can be processed in accordance with the brightness of the object.

According to one aspect of the present invention, a digital camera includes an image sensor having a plurality of two-dimensionally arranged pixels capable of selectively reading out signals from desired pixels for the purpose of at least two of the processes for light metering, focus detection, white balance calculation and picture image forming, and wherein one process is started in response to completion of outputting the signals for another process.

Furthermore, in the sequential processes among light metering, focus detection, white balance calculation and picture image forming, one process starts immediately after completion of another process without waiting synchronization signal for proceeding to the next process, so that the processes are quickly proceeded and the time lag to picture image forming can be minimized.

BRIEF DESCRIPTION OF THE DRAWINGS

FIG. 2a is a diagram showing an arrangement of a filter attached to an image sensor used for a digital camera according to the present invention.

FIG. 2b is a diagram showing another arrangement of a filter attached to an image sensor used for a digital camera according to the present invention.

FIG. 13 is a detailed diagram showing an area for light metering within a display in a viewfinder of a digital camera shown in FIG. 8.

FIG. 14 is a detailed diagram showing areas for light metering and focus detection within a display in a viewfinder of a digital camera shown in FIG. 8.

DESCRIPTION OF THE PREFERRED EMBODIMENTS

Figure 1:
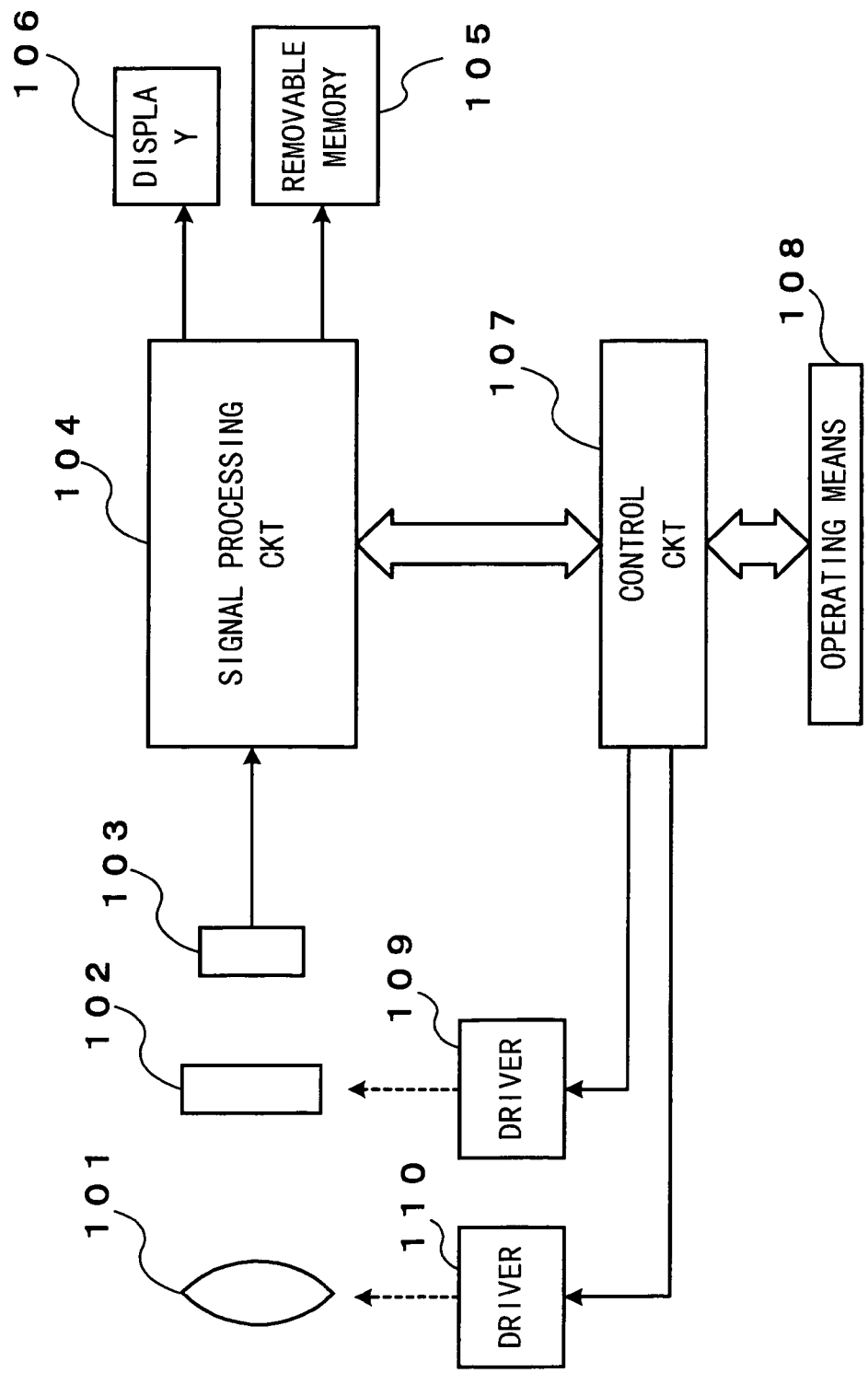
FIG. 1 is a block diagram showing an embodiment of a digital camera according to the present invention.

An embodiment of the present invention will be described bellow. FIG. 1 is a block diagram showing an embodiment of a digital camera according to the present invention.

In FIG. 1, reference number 101 denotes a picture image forming lens for forming picture image of an object, 102 denotes an aperture stop for limiting light flux incident on an image sensor, 103 denotes a CCD image sensor having, for example, a filter with checker pattern as shown in FIG. 2a, where light flux from the object through the aperture stop 102 forms an image, and is changed into electric signal. An example of the aperture stop is shown in FIG. 3.

Figure 3:
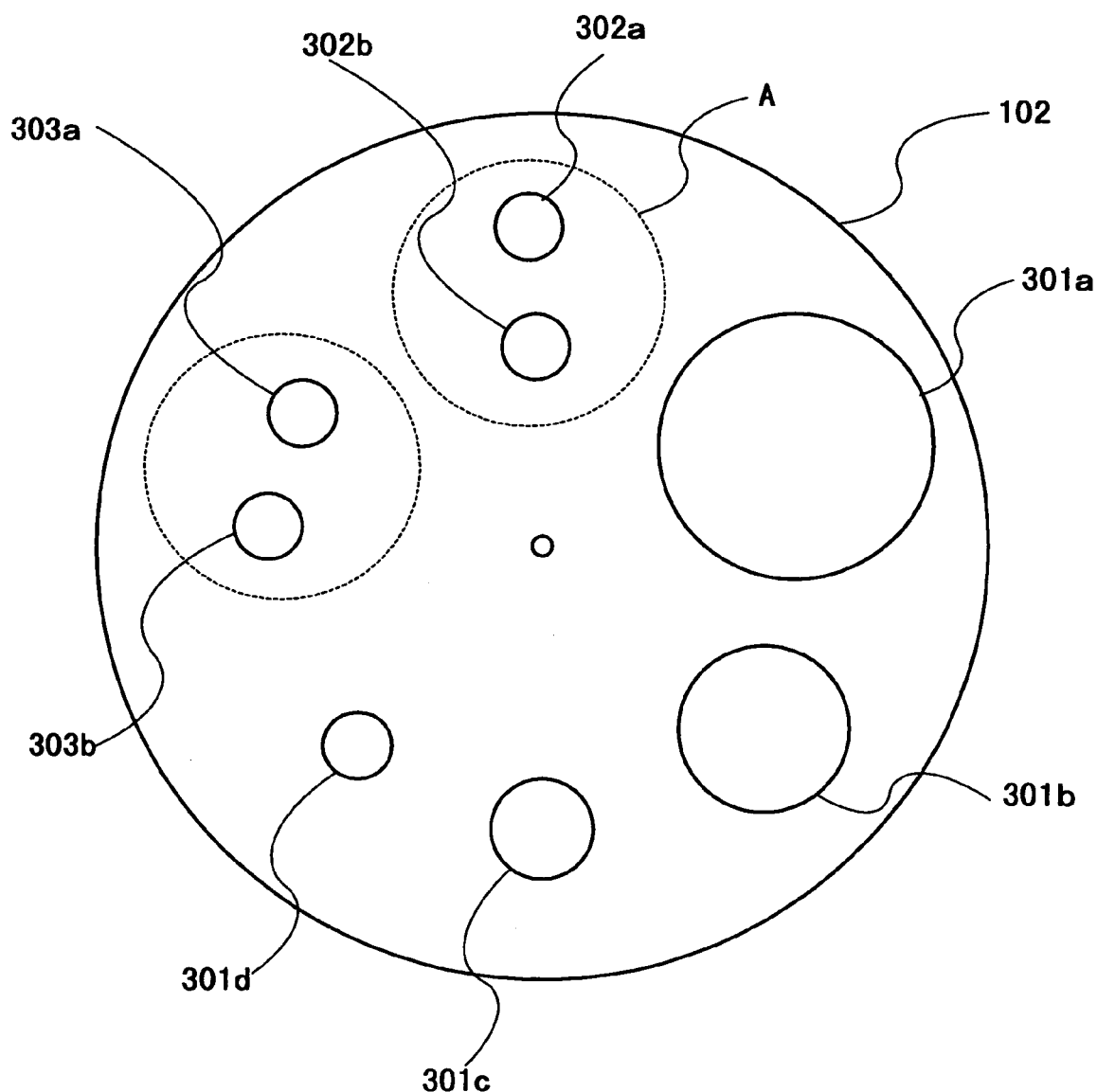
FIG. 3 is a diagram showing an aperture stop used for a digital camera according to the present invention.

In FIG. 3, a plurality of apertures (301a through 301d) having different size in accordance with incident light amount capable of being selected and a pair of apertures arranged horizontally and another pair vertically to the optical axis (302a, 302b, 303a, and 303b) for dividing incident light flux (divided-pupil) in order to perform AF are arranged on the surface of the aperture stop 102 for limiting light flux. On each aperture (302a, 302b, 303a or 303b) for divided-pupil AF, a filter having the same color as that for the image sensor 103 or a filter having the complementary color to that for the image sensor 103 is arranged. In a case for an image sensor having a filter shown in FIG. 2 (a) it is desirable that G (green) filters are arranged on the apertures 302a and 303a, and M (magenta) filters, which is the complimentary color of G, are arranged on the apertures 302b and 303b.

Then, in a signal processing circuit 104, the electrical signal translated from object signal by the image sensor 103 is treated CDS (correlated-double-sampling) processing and gamma processing, transformed into digital signal, performed gain adjustment, interpolation, compression, and the like, which are publicly known processing, and stored in removable recording medium 105 such as a memory card.

Various processing circuits other than publicly known processing according to the present invention, which perform various processing described bellow, are included in the signal processing circuit 104. A first circuit is for discriminating whether output level of the image sensor 103 is appropriate or not while measuring light amount by using apertures for divided-pupil. Specifically, this is a circuit for changing charge-accumulation time of a CCD device, a circuit for setting transmittance of an LCD when the LCD is arranged as apertures for divided-pupil, or a circuit for detecting whether the brightness of AF area reaches proper level after image has been input by a plurality of times when an object is too dark. A second circuit is for discriminating whether the contrast is sufficient or not while performing divided-pupil AF. A third circuit is for separating light flux passed through two apertures into two image signals by using sampling. A fourth circuit is for calculating defocusing amount by calculating cross correlation of the separated two image signals. It is possible to construct these circuits in one ASIC, and, as a result, camera can be made compact.

Further, signals before forming picture image can be confirmed its exposure, focusing, imaging angle, and the like by a display 106. It is certainly possible that image signals stored in the recording medium 105 are reproduced, translated to a signal form suitable for display by the signal processing circuit 104, and shown on the display 106.

A control circuit 107 is for controlling sequence throughout the camera, and is activated to start a series of processes including forming picture image and recording in response to input from a operating member 108 composed of a shutter button, not shown, an AF area selection button, and the like, which is operated by a user. Moreover, the control circuit 107 outputs a signal for rotating the aperture stop 102 to a driver 109 based on results of various processing done by the signal processing circuit 104.

On the occasion of rotating the aperture stop, one of aperture stops (301*a* through 301*d*) is selected when forming picture image, and either pair of apertures for divided-pupil AF (302*a, b,* or 303*a, b*) is selected when processing AF. Furthermore, the control circuit 107 outputs a signal to a driver 110 for moving the lens to a focusing position. Furthermore, the control circuit 107 includes a changing means for changing lens-driving mode from AF to a manual mode when the control circuit 107 discriminates that it is impossible to process AF because of lack of contrast based on calculated result from aforementioned signal processing circuit 104.

Figure 4:
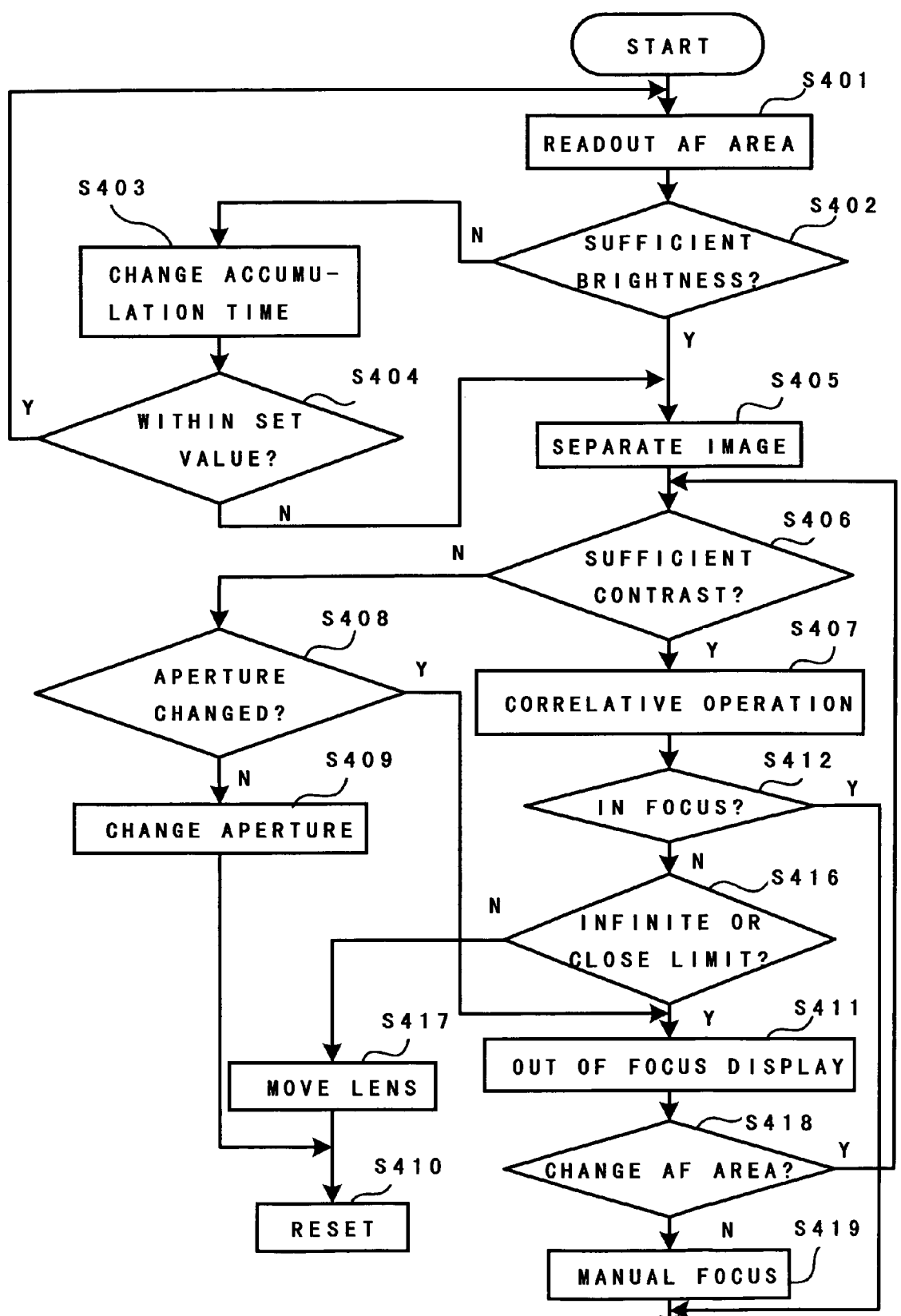
FIGS. 4 and 5 are flowcharts showing AF movement of an embodiment as a digital camera according to the present invention.
Figure 5:
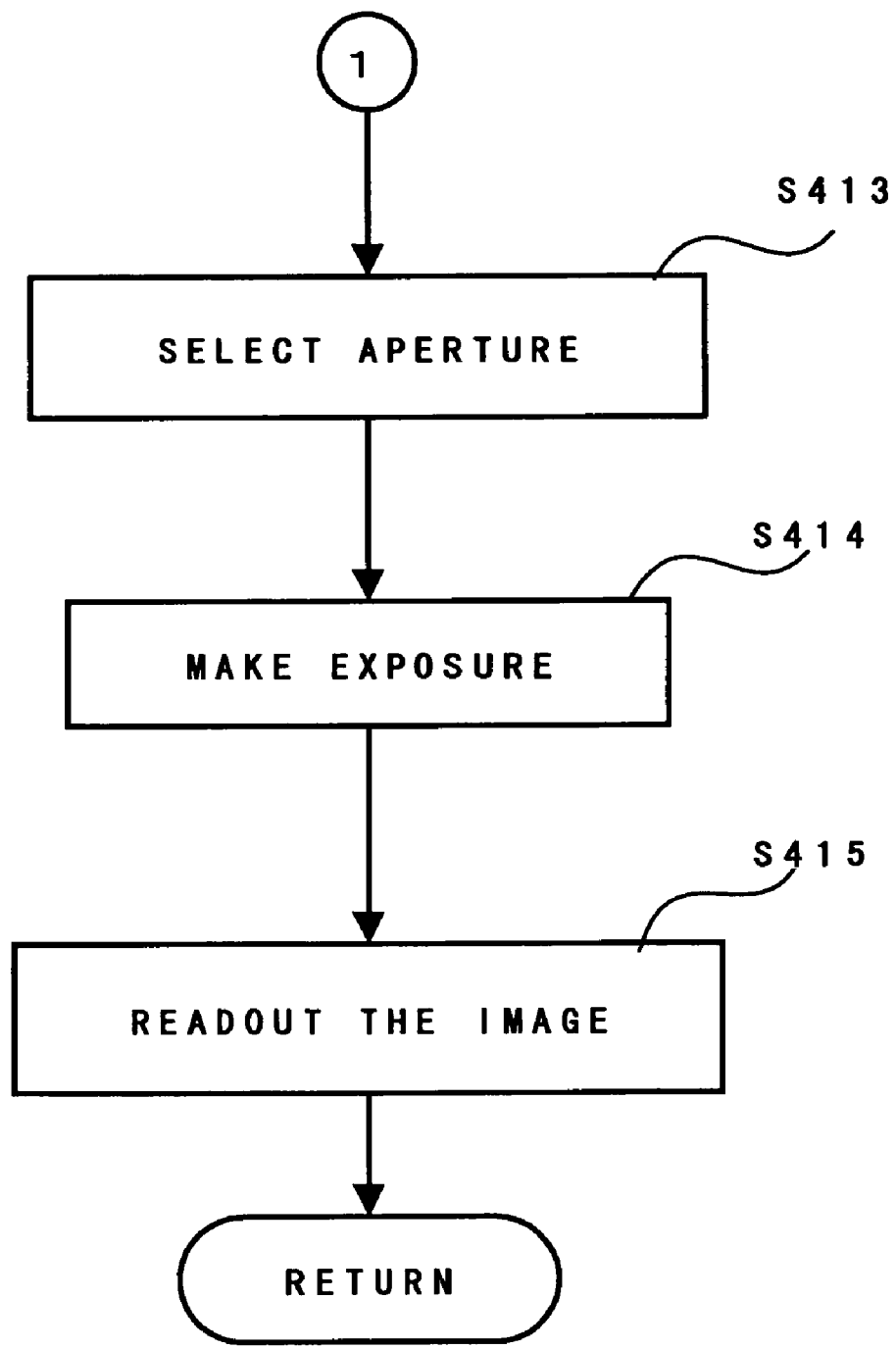
Figure 6:
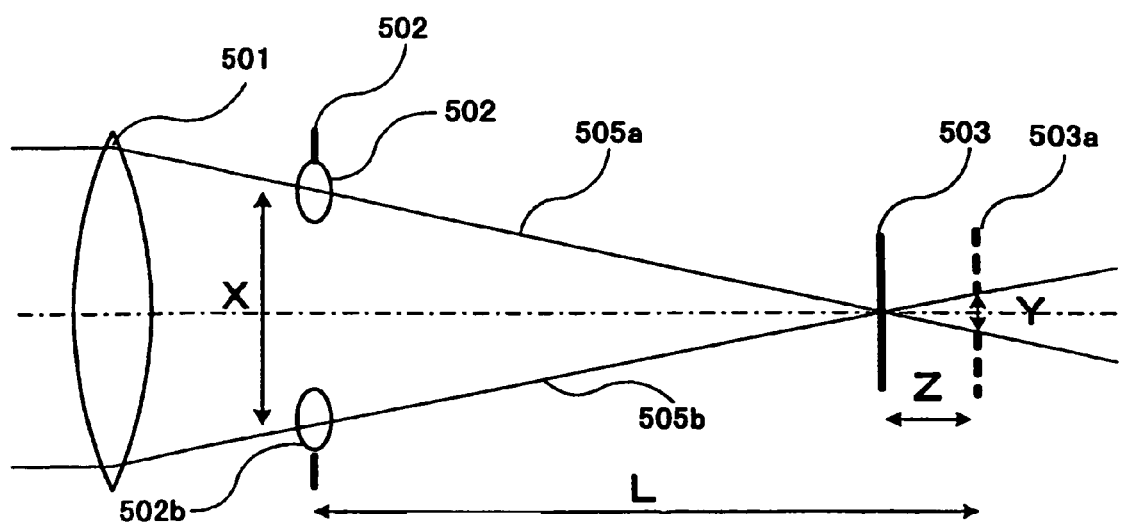
FIG. 6 is a diagram explaining a principle of phase difference detection.
Figure 7:
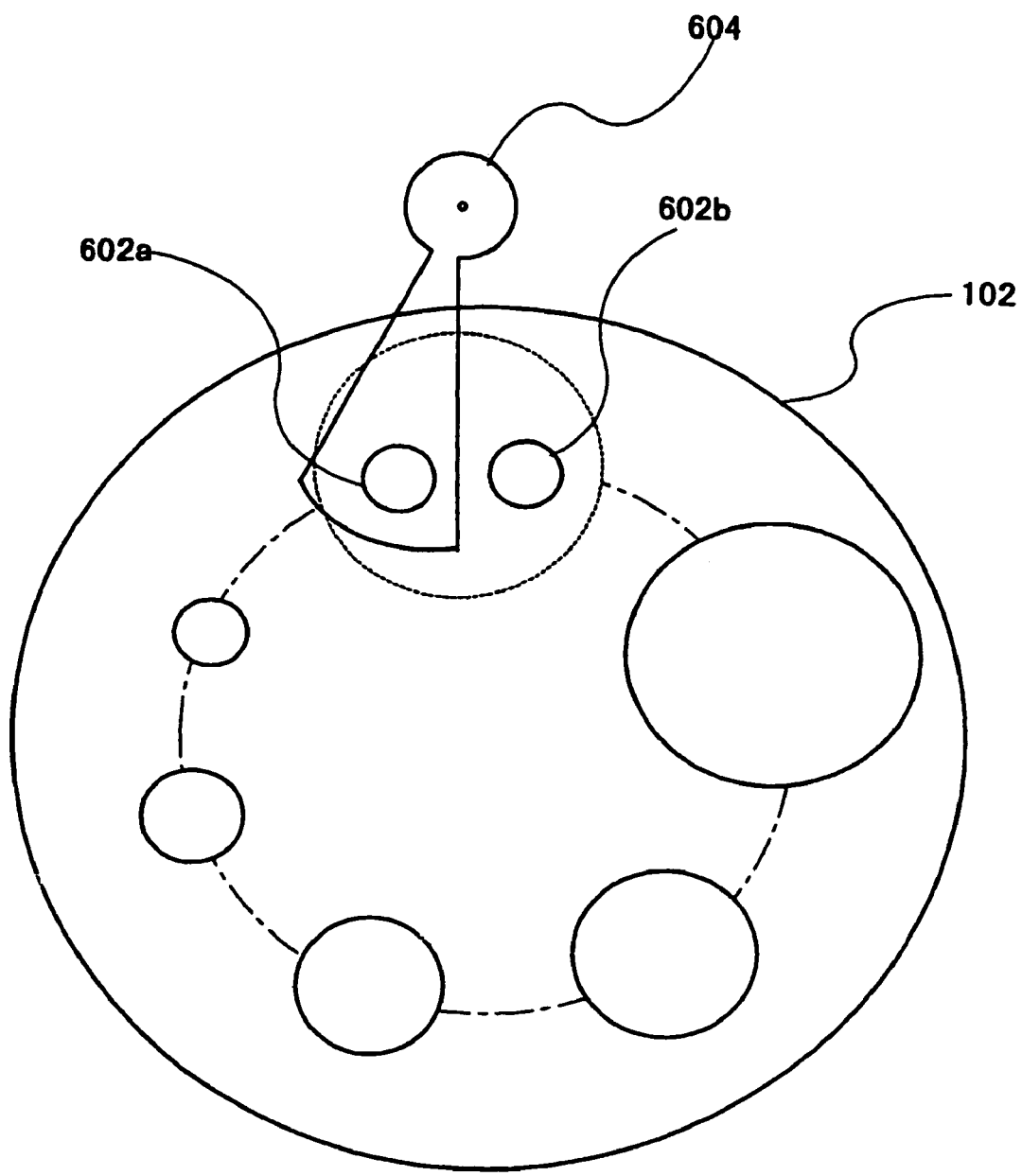
FIG. 7 is a diagram showing arrangement of apertures and a shield used for time sequential pupil division according to prior art.

AF process of the digital camera according to the present invention will be described with reference to the flow chart shown in FIGS. 4 and 5.

In step S401, two colors of light flux having G-image and M-image in the state of mixed color passing through either one pair of apertures for divided-pupil AF 302*a* (G-filter) and 302*b* (M-filter) or 303*a* (G-filter) and 303*b* (M-filter) form images on the CCD 103, simultaneously.

In step S402, whether a brightness of the image is included in predetermined scope or not is discriminated. When it is included in the scope, step proceeds to step S405. On the other hand, when it is not included in the scope, step proceeds to S403.

In step S403, a charge-accumulation time of a CCD device is changed, an exposure is made again, and this step is repeated until the brightness level has become appropriate. If the brightness has not become appropriate in step S402 after repeated this several times and the charge-accumulation time of a CCD device has exceeded the scope capable to be changed, the object must be too bright or too dark. In this case, step proceeds to S405 via S404.

In step S405, the image is divided into G-image and M-image by aforementioned sampling.

In step S406, whether the contrast in the AF area of each divided image is sufficient or not is discriminated. When the contrast is sufficient, in step S407, publicly known cross correlation is calculated between G-image and M-image within AF area after corrected pixel shift of two images. When the contrast is not sufficient in step S406, the aperture stop 102 is rotated to change arrangement of the pupil in steps 408 and 409, and, in step S410, the image after changed arrangement of the pupil is read out. Then, step goes back to S405. The image is divided into G-image and M-image, and calculated cross correlation.

On the other hand, when it is discriminated in step S406 that the contrast is not sufficient even if the arrangement of the pupil is changed in step S409, step proceed to S411 via S408, and displays "unable to focus".

On the contrary, when it is discriminated in step S406 that the contrast is sufficient, cross correlation is calculated in step S407, and whether in focus or not is discriminated in step S412. In step 412, when it is discriminated that the shift between two images is sufficiently small, and the image is in focus, step proceeds to S413 shown in FIG. 5.

In step S413, an aperture stop for an actual exposure for recording is selected.

In step S414, an actual exposure for recording is performed.

In step S415, the recorded image is read out.

When it is discriminated in step S412 that the image is out of focus because of large defocus amount, it is confirmed in step S416 that the lens is within scope of movable range, displace amount of the lens is calculated based on the defocus amount of the image, and the lens is moved to predetermined direction by predetermined amount in step S417. By the way, the direction to move the lens is determined by discriminating shift direction of an image relative to the other one.

After moved the lens by predetermined amount in step S417, the image is read out in step S410, and aforementioned procedures are repeated until it is discriminated to be in focus. When the lens comes to nearest limit or infinity limit in step S416 without discriminating to be in focus in step S412, "unable to focus" is displayed in step S411, and AF area is changed in step S418. This change can be performed automatically, or arranged to set manually.

When AF area is changed in step S418, step goes back to above-described S406, contrast is confirmed, and above-described predetermined procedure is followed. When AF area is not changed, or when AF area is changed predetermined times without reaching "in focus", step proceeds to S419 and the lens-driving mode is changed to a manual mode. Then, after manually adjusted focusing, step proceeds to S413 shown in FIG. 5, an image of the object is exposed for recording, and the flow is terminated.

By the way, in the explanation up to now, although the filter arrangement of a CCD is assumed to be one shown in FIG. 2*a* that is an R-G-B checked fundamental color filter, an arrangement of G stripe and R-B in turn linearly as shown in FIG. 2*b* can be applicable. In the latter case, however, pixel shift can be corrected by horizontally shifting either G-image or M-image by one pixel. Moreover, the filter arrangement of an image sensor is not limited to these types. The present invention can be applied to other filter arrangements by changing filter for divided-pupil in accordance with the arrangement. In this embodiment, although a color filter is arranged on an aperture of the shield, the position for arranging the filter is not limited to this position so long as it is vicinity to the aperture and across the light flux.

Figure 8:
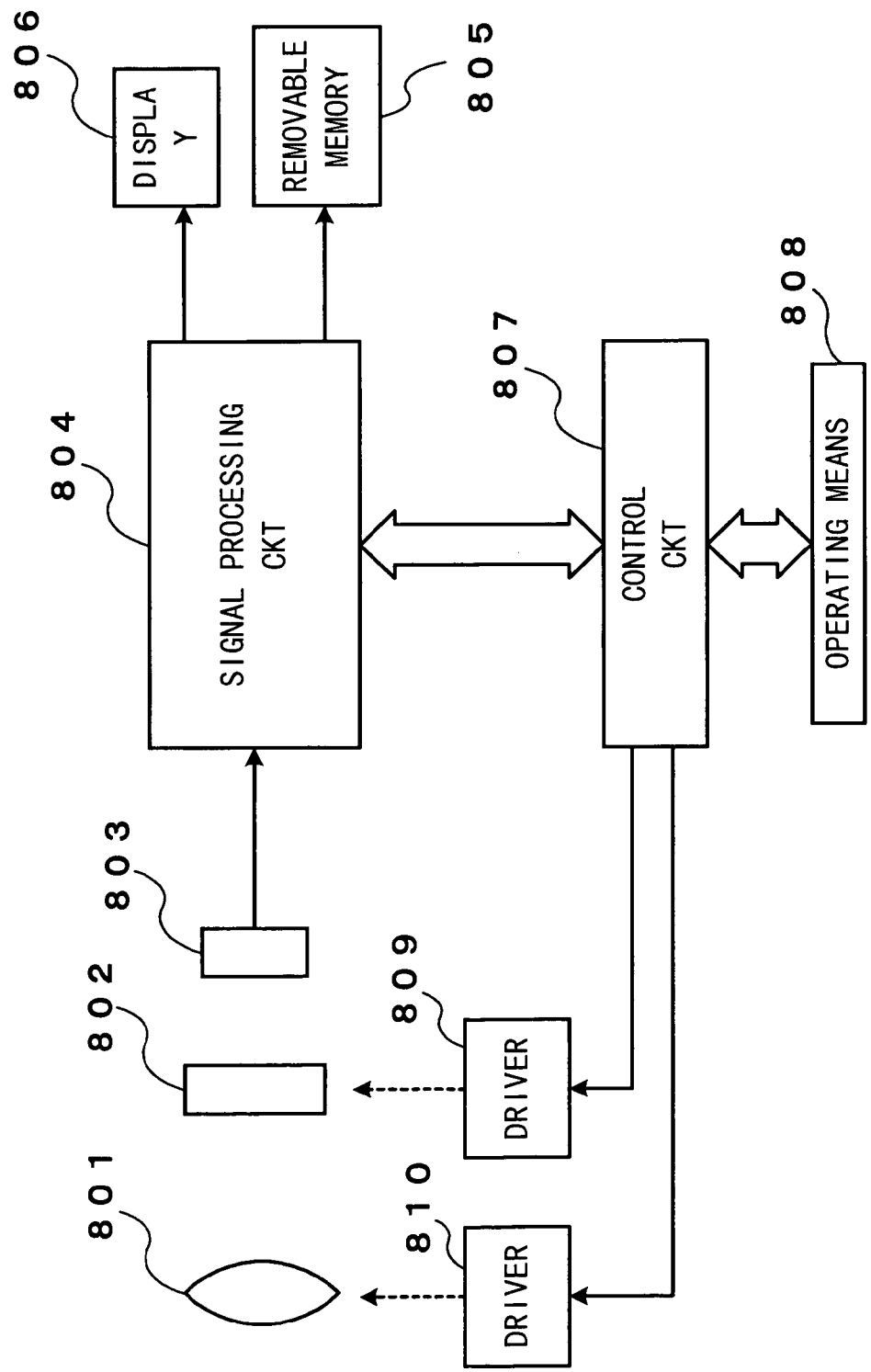
FIG. 8 is diagram showing a second embodiment of a digital camera according to the present invention.

Then, a second embodiment of the present invention will be explained. FIG. 8 is a block diagram showing a digital camera according to the present invention. In FIG. 8, a block having the same function as shown in FIG. 1 is denoted by only its name.

In FIG. 8, reference number 801 denotes a picture image forming lens, 802 denotes an aperture stop having a plurality of apertures shown in FIG. 3, 803 denotes a CMOS image sensor having, for example, a filter arrangement shown in FIG. 2 (*a*), which uses an artificial retina chip capable of outputting signal from arbitrary pixel randomly, and, also, outputting added or averaged signals of a plurality of pixels within the image sensor. An image signal transformed into electrical signal by the image sensor 803 is processed by a signal processing circuit 804, which is same well-known processing as described in 104 in FIG. 1, and stored in a recording medium 805. Other than aforementioned various processing, the signal processing circuit 804 includes a circuit for calculating a shutter speed and a f-number from a signal based on an exposure for light metering, and a circuit for calculating white balance to a recorded image from a signal based on an exposure for processing white balance process. A display 806 makes it possible to confirm recorded and reproduced pictures.

A control circuit 807, as same as 107 in FIG. 1, is activated to start a series of processes including forming picture image and recording in response to input from a operating member 808. Other than various buttons explained in FIG. 1, the operating member 808 includes an AE mode-selection button for selecting a spot metering, a center-weighted metering, or the like, an AE/AF area-selection button, an AE/AF area-exchange button for exchanging the function of the AE/AF area-selection button, a release selection button for selecting whether or not release shutter on occasion of "out of focus" in AF mode, an initial-time-setting button for setting initial time interval for reading out detected signal for light metering, and the like.

Moreover, the control circuit 807 gives an order to a driver 809 for rotating the aperture stop 802 and selecting either aperture (602 through 605) based on AE calculation while forming picture image, and either aperture for divided-pupil AF (606 or 607) while performing AE or AF. Furthermore, the control circuit 807 gives an order to a driver 810 for driving the picture image forming lens 801 to a focusing point based on AF calculation while performing AF.

Figure 9:
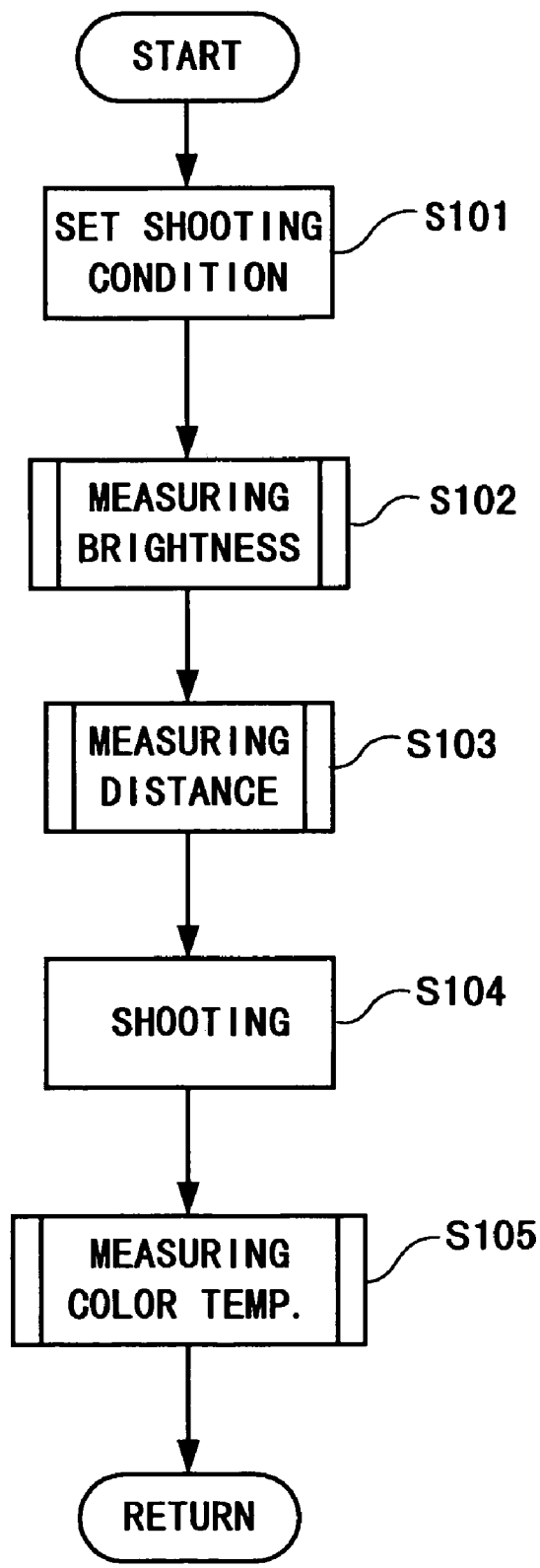
FIGS. 9, 10, and 11 are flowcharts showing procedures for forming picture image according to a digital camera shown in FIG. 8.

FIG. 9 is a flow chart explaining the procedure for forming picture image by a digital camera according to the present invention.

In step S101 in FIG. 9, after power source is on, various initial setting to the camera is processed by the aforementioned various operating member (808 in FIG. 8) in order to process light metering and focus detection as a first stage of forming picture image. As for the light metering, there are mode selection of light metering such as a center-weighted metering, a spot metering, and the like, and area selection of light metering where the light metering is processed. As for the focus detection, a position where the focus detection is performed is selected. In this position for light metering and focus detection, when a photographer does not select any area for light metering or focus detection, central position where the important subject may exist is initially selected.

Then, light metering is started processing in step S102. Exposure signal from selected area for light metering of the image sensor is read out. When the signal level reaches to a predetermined signal level, calculation of a shutter speed and f-number for forming picture image is immediately started.

At a same time, in next step S103, focus detection of an object is started by using signal from an area usually same as the area for light metering selected in step S101. When an area for focus detection different from the area for light metering selected in step S101 is selected, it is needless to say that focus detection is performed based on the signal from selected area for focus detection. The detail of the focus detection will be described later.

As a result of step S103 when the object is in focus, the object is immediately exposed for recording in step S104. However, shutter can be released only when the aforementioned steps for light metering and focus detection are completed. When signals from the image sensor are output in step S104, white balance process is immediately started in step S105. As a result of processing white balance process, white balance of the object is obtained by well-known processing such as nullifying color-difference signal, and after processes such as gamma adjustment, data compression, and the like have been completed the data is recorded on the recording medium 805. By the way, while half-depressing the shutter button, step S102 for light metering and step S103 for focus detection are repeated.

In the embodiment described above, processes of light metering and focus detection are processed successively. In other words, when output signal resulted from a process is obtained, a calculation based on the output signal is performed and, at the same time, another process is started. Moreover, white balance process is performed after completed exposure for recording, so that time lag to forming picture image can be minimized.

Figure 10:
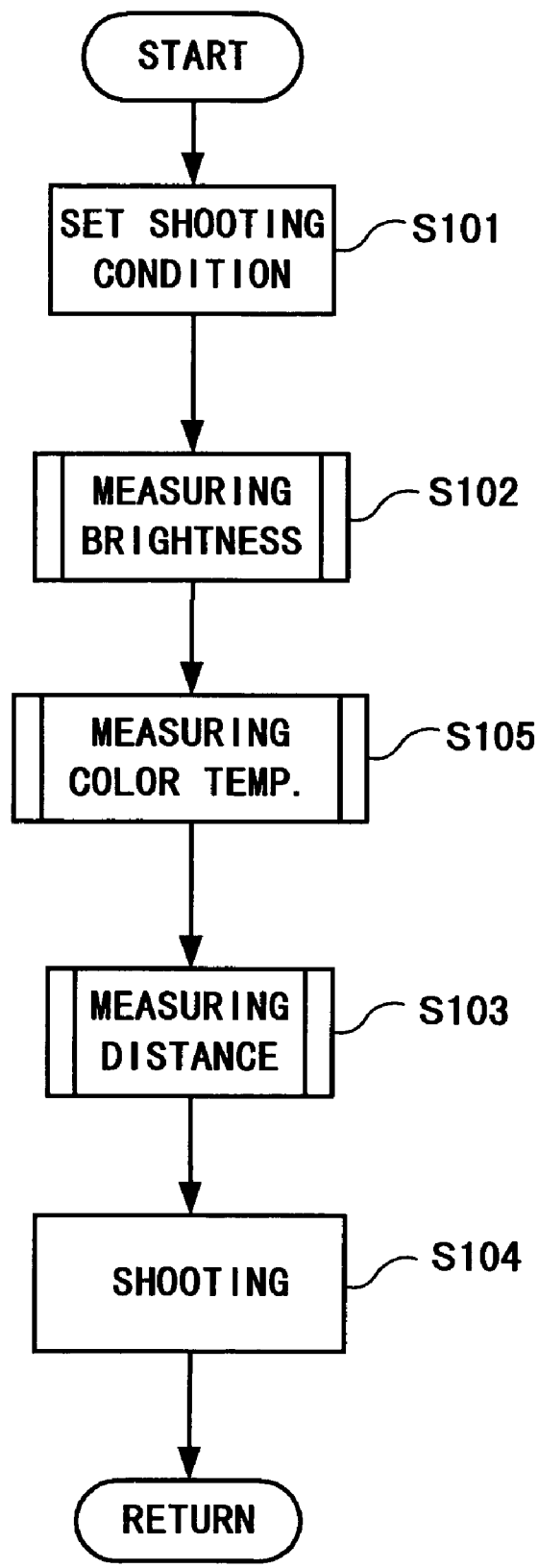
Figure 11:
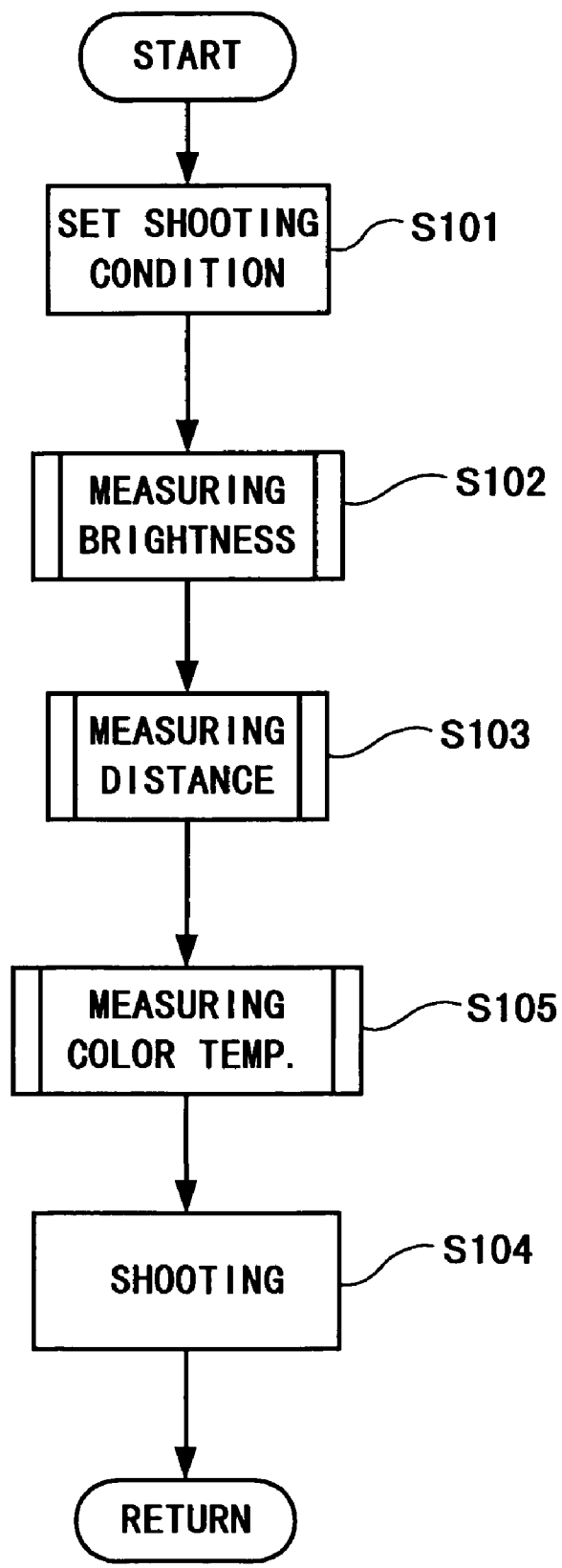

As for the image sensor, when an aforementioned non-destructive type device is used, the procedure for forming picture image shown in flow charts in FIGS. 10 and 11 becomes possible. In FIG. 10, step S105 comes before steps S103 and S104. In other words, when optimum output is obtained from the image sensor as a result of process for light metering, calculation for light metering is started, at the same time, signal for performing white balance process is output from the image sensor with approximately same exposure state, calculation for white balance is started, and, at the same time, signal for focus detection is output from the selected area for focus detection, and calculation for focus detection is started, so that the time lag to the next forming picture image can be extremely shortened.

In the case of FIG. 11, steps S101 through S103 are same as FIG. 9. However, steps S104 and S105 are reversed. In other words, the signal accumulated on processing focus detection is used for calculating white balance after light metering and focus detection have been completed, so that the time lag to the next forming picture image can also be extremely shortened.

In above-described processes for performing white balance process and calculating white balance, it is needless to say that white balance can be set manually. In this case, the step for processing white balance process can be left out from the aforementioned procedure, so that the time lag to the next forming picture image becomes same as FIG. 9.

Figure 12:
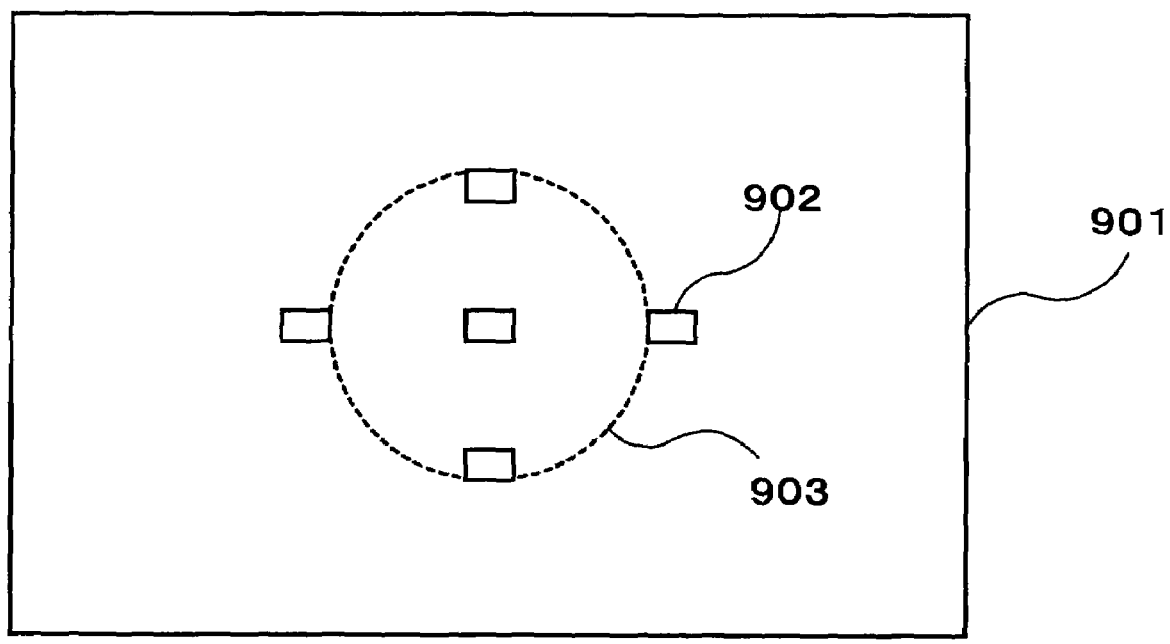
FIG. 12 is a diagram showing a display in a viewfinder of a digital camera shown in FIG. 8.

Light metering and focus detection among these picture image forming procedure is described specifically in FIG. 12 and figures following this. FIG. 12 shows areas for light metering and those for focus detection in a view finder 901. In FIG. 12, five small rectangles 902 denote areas for spot metering and spot focus detection. One area among these five areas is selected by the operating member 808 having an AE/AF area-selection button and an AE/AF area-exchange button shown in above-described FIG. 8. Although it is usually set that an area for spot metering is coincide with that for spot focus detection, it is needless to say that the area for spot metering can be different from that for spot focus detection.

Figure 16:
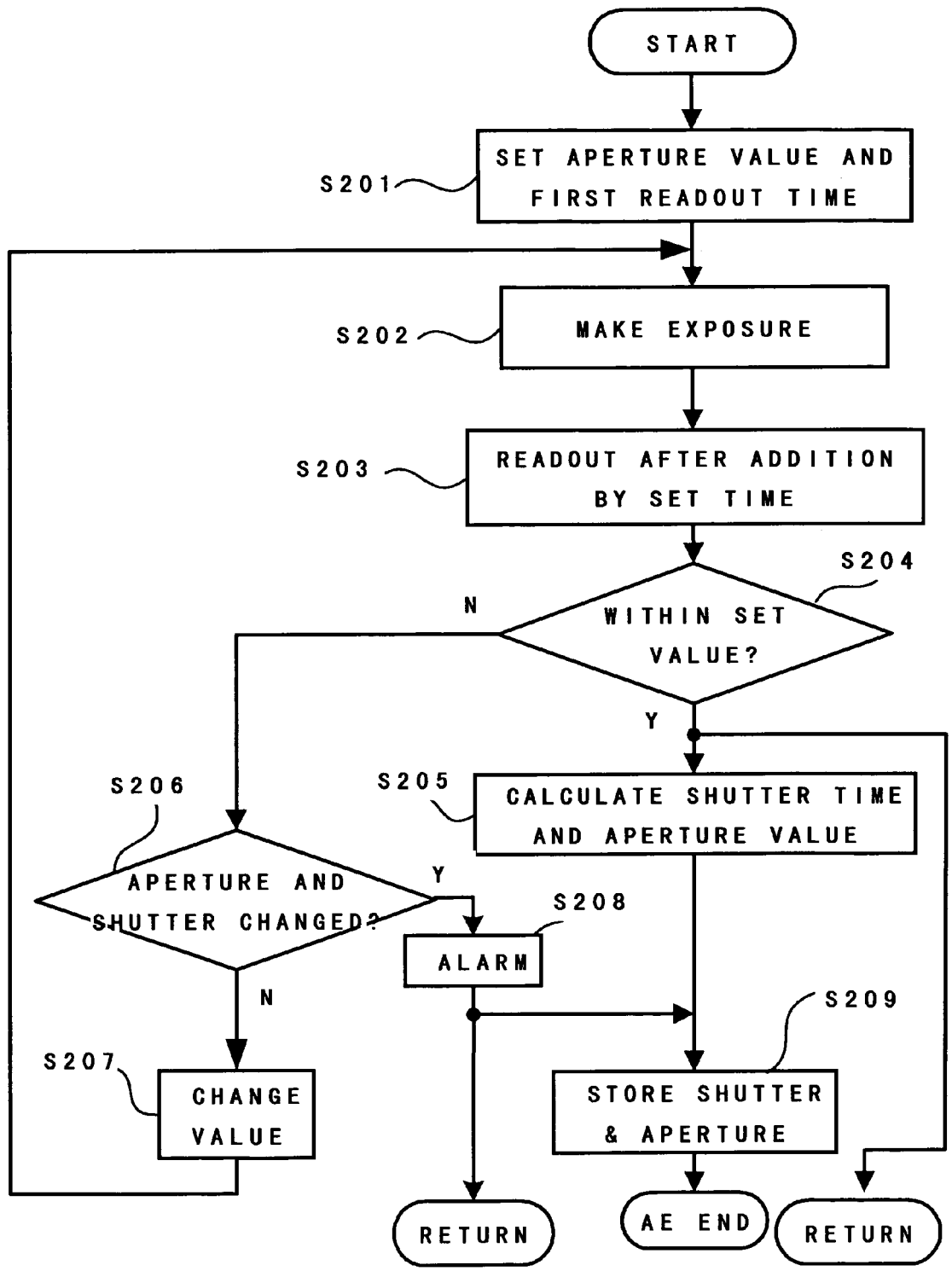
FIG. 16 is a flowchart showing procedure for light metering according to a digital camera shown in FIG. 8.

Then, light metering is explained with reference to a flow chart in FIG. 16.

Figure 15:
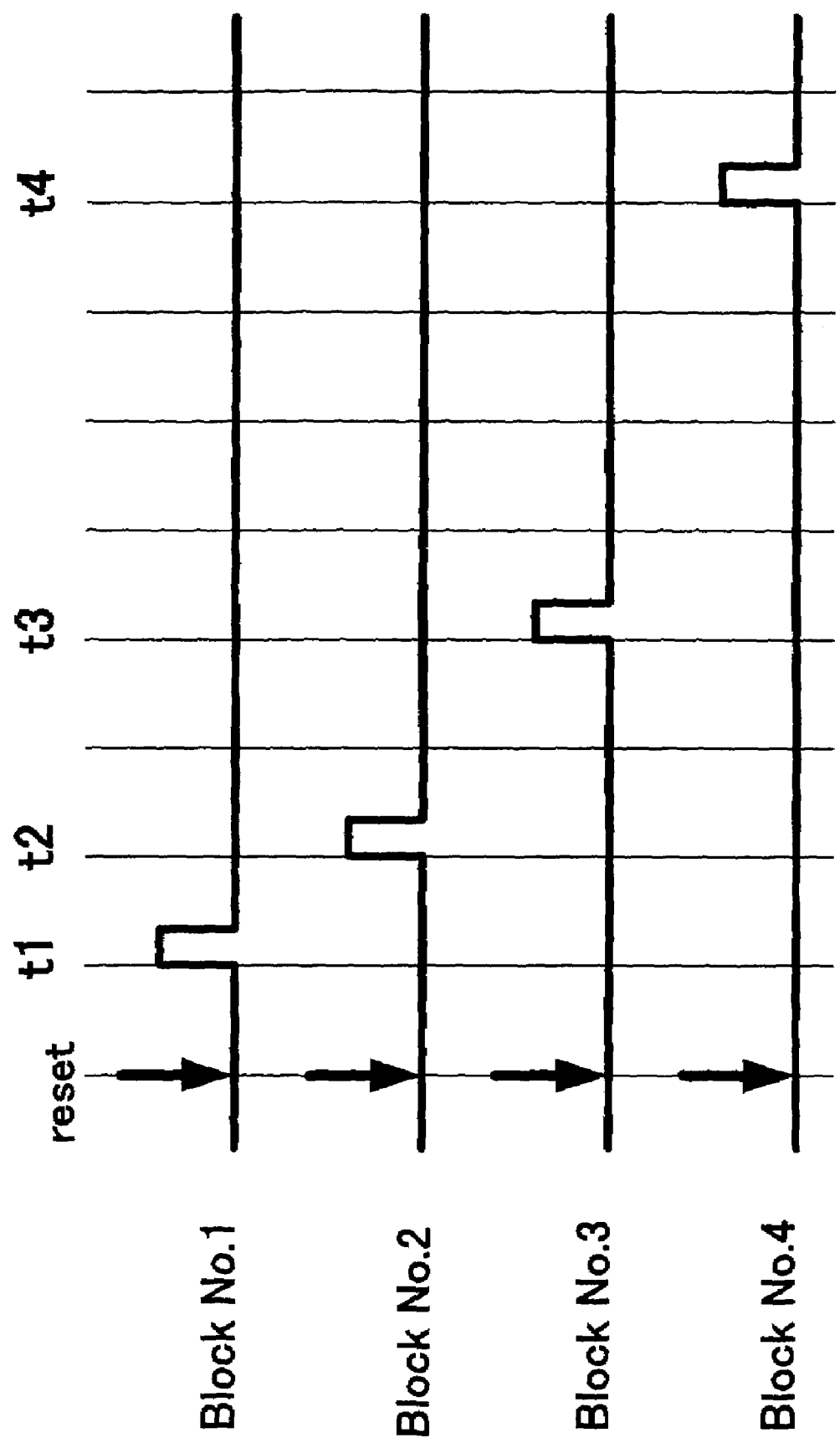
FIG. 15 is a graph showing a timing for getting outputs from an image sensor while light metering.

In step S201, an aperture for light metering and a way of exposure are selected. In this case, apertures 301*a* through 301*d* for forming picture image and pairs of apertures 302*a* and 302*b* can be used as well. Here, either one pair of apertures 302*a*, 302*b* or 303*a*, 303*b* are used in order to be able to quickly proceed to a process for focus detection described later. Moreover, in reading out interval after exposure, t1, t2, t3, . . . of time interval after resetting the image sensor are set to be exponent of two as shown in FIG. 15 in the digital camera according to the present invention in advance, and the first reading out time (t1) is set here.

In step S202, the image sensor is reset and exposure to the image sensor is started.

In step S203, signal stored in an area for light metering (902 or 903 in FIG. 12) on the image sensor is read out with previously set time interval (t1, t2, t3, . . . ). The way of reading out is different in accordance with the type of image sensor such as non-destructive type and destructive type described before.

In case the image sensor is non-destructive type, signal from all pixel in one of the selected area among five areas 902 and a center-weighted area in FIG. 12 is read out with previously set time interval in order from shorter interval. In other words, averaged light level in the selected area can be read out continuously along passing time.

On the other hand, in case the image sensor is destructive type, the structure of an area for light metering and the way of reading out is different from those using non-destructive type image sensor, so that this case is described below. FIG. 13 is a drawing enlarged one of five areas 902 in FIG. 12 when a destructive type is used for the image sensor. For the purpose of simplicity, the area is divided five both vertically and horizontally and made it total twenty-five sub-areas. Attached number in each sub-area is corresponding to four kinds of reading out time intervals (t1, t2, t3 and t4), respectively, in FIG. 15. Each divided sub-area may be constructed by a block of pixels, for example, 2×2 or more. Charges accumulated in the pixels within a same block or blocks set to be same time interval are added, and output.

By constructing like this, average signal level stored in a plurality of pixels in the area is obtained in order from shorter reading out time interval, so that state of signal accumulation can be observed in real time even in destructive type image sensor. Above-described block may be constructed by one pixel.

In step S204, signal read out by different way in accordance with destructive/non-destructive type of the image sensor is discriminated whether the signal level is within a range of predetermined level. The lower limit is an output level capable of obtaining an SN not producing error while calculating light metering. On the other hand, the upper limit is an output level of the image sensor just before saturating. When the output signal level is discriminated to be within the range of the predetermined level, the flow proceeds to step S205.

In step S205, a shutter time and f-number for actual picture image forming is calculated. Specifically, when an output signal level read out a certain time among signals read out in order from shorter time interval such as t1, t2, t3, . . . is within the range of the predetermined level, the calculation for determining a shutter speed and f-number is started without delay, and, at the same time, flow proceeds to a step for focus detection or performing white balance process. When the calculation for determining a shutter speed and f-number used for actual picture image forming has been completed in step S205, flow proceeds to step S209.

In step S209, a shutter speed and f-number are stored in the control circuit 807 in FIG. 8, and the flow regarding light metering is completed.

On the other hand, it is described below that the signal level read out from the image sensor in step S204 is discriminated to be out of the range of the predetermined level. The flow proceeds to step S206.

In step S206, whether the aperture stop and the first reading out time are the same values as those set originally or not is discriminated. When the values are remained same, the flow proceeds to step S207.

In step S207, aperture stop and reading out interval are changed in order to change exposure condition according to the brightness of the object. As initial setting, there are ten ways of reading out time interval t1, t2, t3, . . . , t10, and each reading out time is set to be exponent of two such as 1"/2048, 1"/1024, 1"/512, . . . , 1"/4. When output level of read out signal at readout time t1 is already reached to saturating level of the image sensor because of too bright object, the aperture stop is set to be minimum aperture shown in FIG. 3, the shutter speed is set to be a speed as fast as possible, or these conditions are combined together. Accordingly, an object having higher brightness can be measured its brightness. A newly set fastest reading out time interval is also set to be exponent of two as same as above.

On the other hand, when output level of read out signal at originally set read out time t10 is not reaches to appropriate level because of too dark object, the aperture stop is set to be maximum aperture, or the shutter speed can be set to be long within a range not to produce degradation of imaging quality of the image sensor. In this case also, the reading out time interval is set to be exponent of two.

In above-described cases, the reading out time interval is changed after one measurement for light metering has been processed. When it is known in advance that background brightness condition is too dark or too bright, initial setting in step S201 can be changed in advance. Specifically, when a night view picture image, which is dark, is going to be formed, a first reading out time interval should be changed to 1"/512. On the other hand, when a picture image of outdoor ski scene, which is very bright, is going to be formed, a first reading out time interval should be changed to 1"/4096. Therefore, the time to light metering can be shortened. These setting can be performed by using the operating member 808 in FIG. 8.

After re-setting has finished in step S207, flow goes back to step S202.

In step S206, when the aperture stop or the shutter speed has already been changed, flow proceeds to step S208, and a warning sign for over exposure or under exposure is displayed on the camera. Immediately after that flow proceeds to steps for focus detection or performing white balance process. At the same time, the maximum or minimum value of the aperture and shutter speed to which the camera can be set are stored in the control circuit 807 in FIG. 8 in step S209, and the flow for AE is completed.

FIG. 14 is another example of an area for light metering using destructive type image sensor. In this case, one of five selection areas 902 in FIG. 12 is further divided into three areas. The upper and lower part are used for detecting signals for light metering, and the central part is used for detecting signals for focus detection. With constructing like this, when average signal output from upper and lower blocks for light metering reaches to appropriate signal level, the calculation of light metering is immediately started, and, at the same time, the calculation for focus detection can be started based on the signal read out from each pixel in the central area for focus detection, so that the image sensor need not to be reset in order to make exposure for focus detection after making exposure for light metering, and, therefore, there is no waste of time.

Then, a flow chart for focus detection will be roughly explained with reference to FIG. 17.

In step S301, an exposure for focus detection is processed in this step. However, when a non-destructive type is used for the image sensor, electric charge accumulated by the aforementioned exposure for light metering can still be used, so that this step is unnecessary. On the other hand, when the selected area structure shown in FIG. 14 is used even if destructive type image sensor is employed, the image sensor need not to be reset for new exposure, and signals for focus detection can be obtained immediately after light metering. In step S302, on reading out each signal from the selected AF area, when the brightness of an object is low as a result of preceded steps for light metering, signal level is made larger by electrically enlarging gain, and, as a result, contrast is enhanced. Then, flow proceeds to step S303.

When the brightness of the object is low, other than this way of enlarging gain, output signal level can be enlarged by adding signals of adjacent two pixels and outputting them. On processing this addition, other than a way that the first and second pixels are simply added and output, and, then, the third and fourth pixels are added and output, there is a way that the first and second pixels are added and output, and, then, the second and third pixels are added and output, and following addition is processed increasing by one pixel at a time. The latter way makes it possible to prevent degradation of resolving power. Of course it is possible to add more than two pixels at a time. By the way, adjacent pixels used here denote adjacent pixels forming image of same color.

Although step S303 is usually unnecessary when signal for AF is read out immediate after light metering, it is necessary when the brightness of the object changes while moving lens because of out of focus explained later. When the output signal level from the AF area is discriminated to be out of the predetermined range, flow proceeds to step S304 for light metering again.

When the output signal level from the AF area is discriminated to be within the predetermined range, flow proceeds to step S305.

In step S305, well known cross correlation calculation is performed and flow proceeds to step S306.

In step S306, whether the object is in focus or not is discriminated based on the result of step S305. When the object is discriminated to be in focus, the flow for focus detection is completed, and proceeds to steps for forming picture image or for performing white balance process. When the object is discriminated not to be in focus, a moving amount for the lens is calculated based on the shift amount calculated in step S305, and flow proceeds to step S307.

In step S307, whether the moving amount reaches beyond movable range (infinity limit or close object limit) of the picture image forming lens or not is discriminated. When the moving amount is discriminated not to reach beyond movable rang, flow proceeds to step S308.

In step S308, the lens is moved by the moving amount and flow proceeds to step S309.

In step S309, the image sensor is reset, and flow goes back to step S301.

On the other hand, when the moving amount is discriminated to reach beyond movable rang, or when the object is discriminated not to be in focus certain times, flow proceeds to step S310.

In step S310, unable to focus is displayed, and the AF flow is completed.

In explanation above, although flow proceeds to next step for forming picture image in spite of out of focus, it may be set that forming picture image is not allowed without in focus. This is a matter of photographer's taste.

Regarding the procedure for focus detection described in FIG. 17, a procedure for AF is described in detail with reference to FIG. 18. Step S501 can be used both as exposure for light metering and that for AF as described before. Two colored light flux passing through apertures for divided pupil 302a (Green filter) and 302b (Magenta filter), or 303a (Green filter) and 303b (Magenta filter) are focused on the image sensor 803 with a state of mixed colors of Green-image and Magenta-image at the same time.

In step S502, signals for Green-image and Magenta-image formed in AF area are read out separately by sampling.

In step S503, when the output signal level is not within a predetermined range, flow proceeds to step S504, and performs exposure again. On the other hand, when the output signal level is within the predetermined range, flow proceeds to step S505.

In step S505, whether contrasts of the images in AF areas of the separated images are sufficient or not is discriminated. When the contrasts are sufficient, flow proceeds to step S506.

In step S506, correction of pixel-shift produced in AF area of Green image relative to that of Magenta image (in this case, whole pixels of either one image is shifted by one pixel to horizontal direction) is performed, and well-known cross correlation calculation is performed. In order to process AF calculation quickly, shift amount of one pixel can be corrected after cross correlation calculation. Moreover, the correction of pixel-shift is not necessary when the cross correlation calculation is performed to the Green and Magenta images whose lacked pixels are interposed for correction.

On the other hand, in step S505, when the contrasts are not sufficient in such a manner that the direction in which contrast in AF area of an object exists is not the same direction of a pair of apertures, flow proceeds to step S507.

In step S507, whether the aperture has not been changed or not is discriminated. When the aperture has not been changed, flow proceeds to step S508.

In step S508, the aperture stop 802 is rotated in order to change pupil position, so that a pair of apertures 302a and 302b in FIG. 3 are changed to 303a and 303b, and flow proceeds to step S509.

In step S509, the image sensor is reset, and flow goes back to step S501.

On the other hand, in step S505, if it is discriminated that the contrast of the image is not sufficient even if the position of pupil has been changed, flow proceeds to step S513 via step S507.

In step S513, "unable to focus" is displayed and the AF flow is completed.

On the other hand, when it is discriminated that the contrast is sufficient, flow proceeds to step S506.

Figure 17:
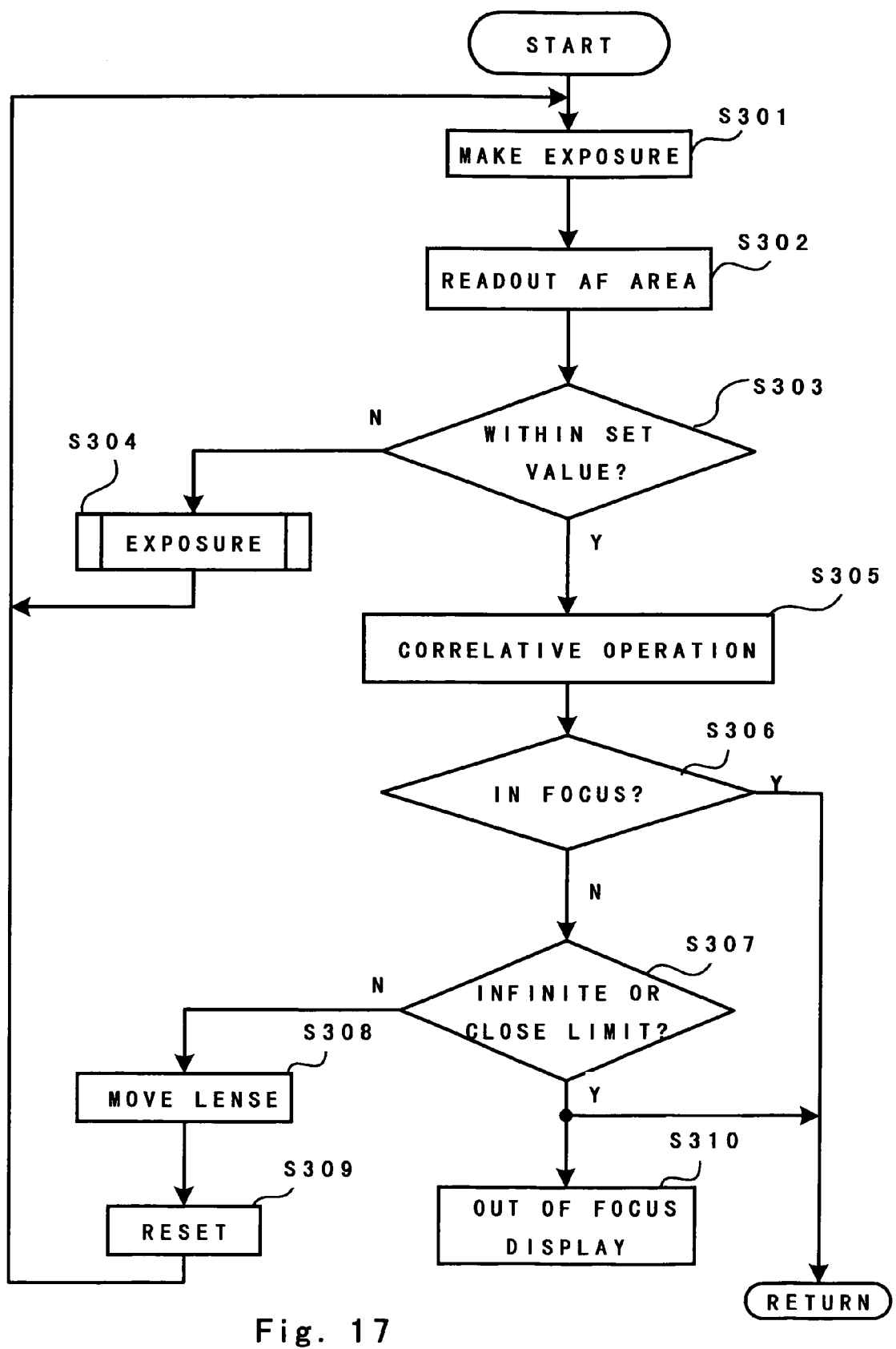
FIG. 17 is a flowchart showing procedure for focus detection according to a digital camera shown in FIG. 8.
Figure 18:
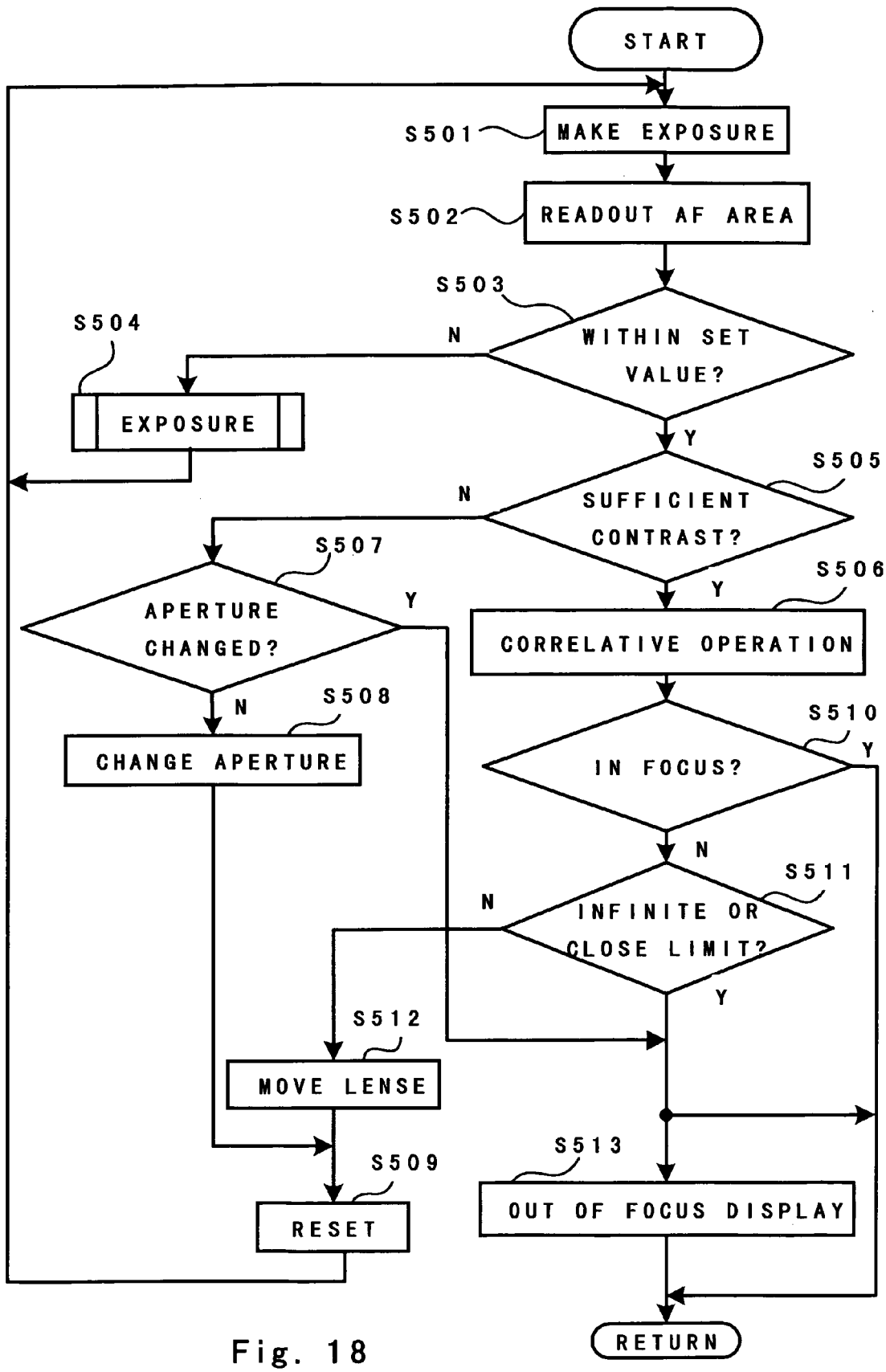
FIG. 18 is a detailed flowchart showing procedure for focus detection according to a digital camera shown in FIG. 8.

In step S506, cross correlation calculation is performed as same as a case in FIG. 17, and flow proceeds to step S510.

In step 510, whether the image is in focus or not is discriminated. When it is discriminated to be in focus because of a small defocus amount between two images, and the flow for focus detection is completed.

On the other hand, in step S510, when it is discriminated to be out of focus, flow proceeds to step S511.

In step S511, whether the moving amount is beyond movable rang (infinity limit or close object limit) of the picture image forming lens or not is discriminated. When the moving amount is discriminated not to reach beyond movable rang, flow proceeds to step S512.

In step S512, the lens is moved predetermined direction. By the way, the direction of movement can be determined by discriminating shift direction of an image relative to that of the other image. Flow proceeds to step S509 for resetting image sensor and returns to step S501. In order to reduce time to form picture image for recording, it is possible to construct flow such that picture image can be formed for recording after repeating re-exposure and focus detection only once.

On the other hand, in step S511, when the lens has already reached the infinity limit or near object limit, flow proceeds to step S513.

In step S513, "unable to focus" is displayed and the AF flow is completed. However, a step for changing AF area can be inserted according to circumstances. This change can be made automatically or can be set manually. Further, it may be constructed that the way of moving the lens is changed to manual when unable to focus. It is best to be constructed that these change in AF area and manual control of the lens are selected according to user's taste.

After the steps for focus detection have been completed as described above, the image sensor is immediately reset, and forming picture image for actual recording is performed using the shutter speed and f-number obtained as a result of aforementioned light metering. On the occasion of forming picture image, although imaging signal read out from the image sensor is usually for whole frame, it is possible to read out thin down signal when the number of recordings to a recording medium should be increased or when cycle time for recording should be shortened.

The read out signal is transformed to digital signal and recorded in a buffer memory for one frame in a hurry, and, then, processed such as gamma processing, white balance processing, compression, and the like, and, after that, recorded in the recording medium 805 as a digital still image. In this case, immediately after the imaging signal has been recorded in the buffer memory, accumulated signals from pixels of the same color filter are added and read out again from the image sensor, and the aforementioned white balance processing is performed based on the magnitude of each color signal to reduce color difference.

Although various processing and movement have usually been performed based on a vertical drive signal as a standard, in the present invention, immediately after one process has been completed another process is started as described above, so that no time is wasted. Moreover, since the signal is read out after performing as much processing possible to be done by the image sensor, processing to be done by hardware and software other than image sensor is greatly reduced, and, as a result, the shutter time lag can be reduced remarkably.

Figure 19:
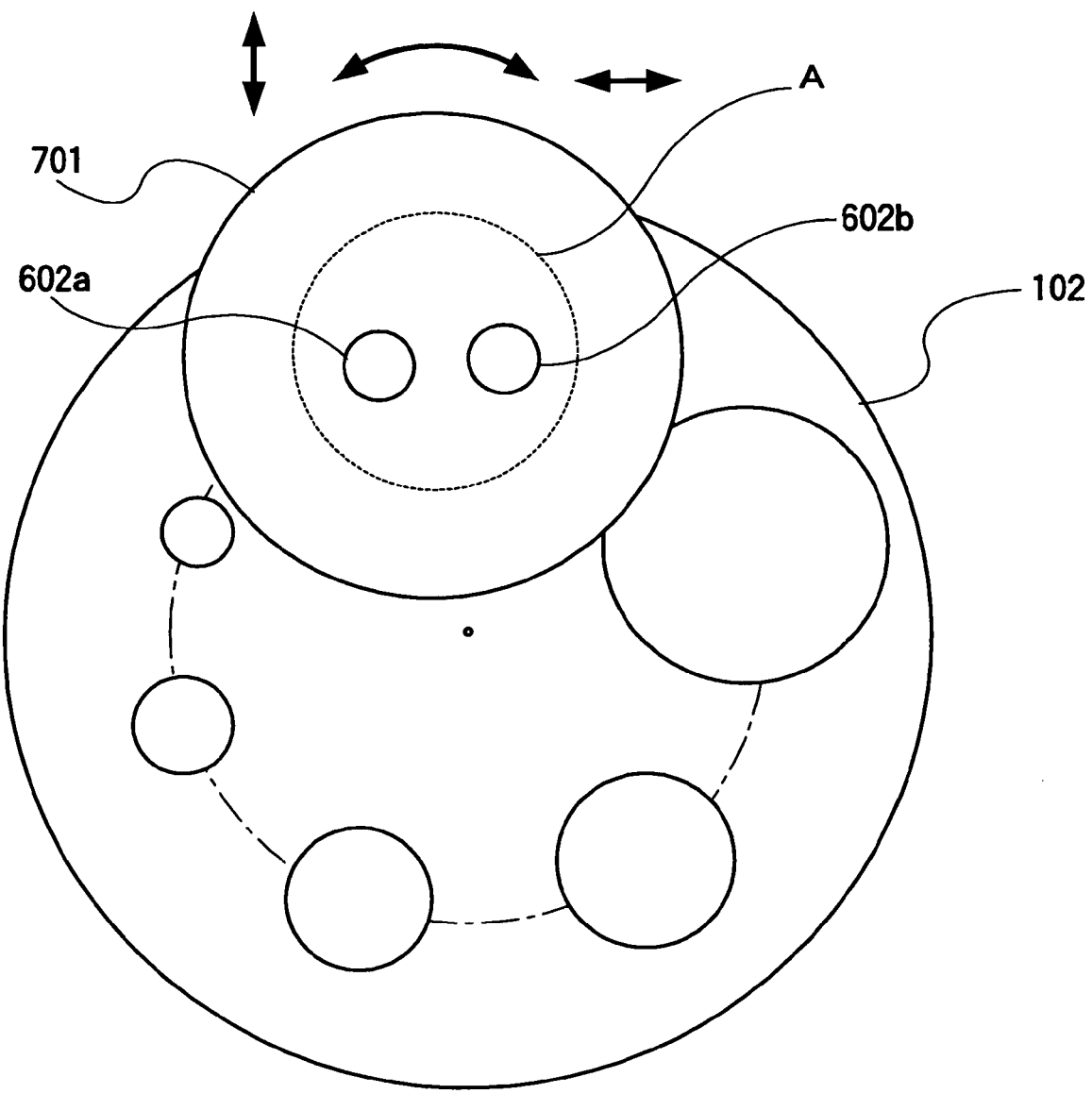
FIG. 19 is a diagram showing another arrangement of aperture stops used for a digital camera shown in FIG. 1.

FIG. 19 is a drawing showing another example of an aperture stop used for a digital camera according to the present invention. In FIG. 19, a circle A shown in a broken line is the maximum aperture used while forming picture image, arranged on a shield 102 having a plurality of apertures having different diameter with each other. A shield 701 having a pair of apertures 602a, 602b for focus detection is arranged in the vicinity of the circle A. The shield 701 can be moved and rotated in the direction denoted by arrows in FIG. 19. The pair of apertures 602a, 602b are always moved within the maximum aperture A, so that focus detection can be processed at almost all area in the picture field.

In the present invention, although it is described that light metering, focus detection and performing white balance process are performed by an image sensor, it is not necessary to use only one device for all process. It may possible to suitably combine each designated devices in order to provide a camera having the most effective shape.

What is claimed is:

1. A digital camera comprising:
    an image sensor having a plurality of two-dimensionally arranged pixels capable of selectively reading out signals from desired pixels and capable of adding signals of at least two pixels prior to getting the output from the image sensor;
    a first processor for processing outputs from individual pixels of the image sensor to form a picture image for recording of an object of the camera; and
    a second processor for processing the added signal of the image sensor for light metering of the object;
    wherein the second processor for light metering processes the added signal obtained by adding signals of given pixels locating in a given area narrower than the whole imaging area of the image sensor, and upon completion of all the light metering with the second processor, all pixels are read out and processed with the first processor, thereby being recorded without resetting the image sensor.

2. A digital camera comprising:
    an image sensor having a plurality of two-dimensionally arranged pixels capable of selectively reading out signals from desired pixels and capable of adding signals of at least two pixels prior to getting the output from the image sensor;
    a first processor for processing outputs from individual pixels of the image sensor to form a picture image for recording of an object of the camera; and
    a second processor for processing the added signal of the image sensor for light metering of the object;
    wherein electric charge is accumulated on the pixels of the image sensor to generate the outputs, and the second processor includes a timer for determining a time length from a start of the accumulation of charge to a time when the added signal reaches a predetermined level, the light metering being in accordance with the time length, and upon completion of all the light metering with the second processor, all pixels are read out and processed with the first processor, thereby being recorded without resetting the image sensor.

3. A digital camera comprising:
    an image sensor with a plurality of color filters having a plurality of two-dimensionally arranged pixels capable of selectively reading out signals from desired pixels and capable of adding signals of two-dimensionally arranged at least three pixels prior to getting the outputs from the image sensor;
    a processor for processing outputs from the individual pixels of the image sensor to form a picture image for recording of an object of the image; and
    a white balance calculator for processing the added signals of the image sensor in accordance with all of a same kind of color filters, respectively, generated before outputting from the image sensor, wherein upon completion of the process with the white balance calculator, all pixels are read out and processed with the processor, thereby being recorded without resetting the image sensor.

* * * * *